United States Patent [19]
Ravani et al.

[11] 3,996,860
[45] Dec. 14, 1976

[54] VEHICLE END ENCLOSURE

[75] Inventors: Chandrakant D. Ravani, Farmington; Ronald G. Schluchter, Highland; Jaroslaw J. Rostafinski, Ferndale; Charles M. Burt, Milford, all of Mich.

[73] Assignee: Portec, Inc., Oak Brook, Ill.

[22] Filed: Mar. 6, 1975

[21] Appl. No.: 555,724

[52] U.S. Cl. .................... 105/368 R; 105/378; 105/410; 105/438; 105/461

[51] Int. Cl.² .................. B60J 5/10; B61D 17/06; B61D 19/00; B61D 23/00

[58] Field of Search ............ 105/340, 368 R, 410, 105/437, 438, 461, 378; 296/55, 147, 148; 160/199, 213

[56] References Cited
UNITED STATES PATENTS

| | | | |
|---|---|---|---|
| 1,757,860 | 5/1930 | Hall et al. | 296/148 |
| 2,690,141 | 9/1954 | King | 105/368 R X |
| 3,017,840 | 1/1962 | Fairweather | 105/368 R |
| 3,854,425 | 12/1974 | Allen | 105/410 |
| 3,911,831 | 10/1975 | Blunden | 105/368 R X |
| 3,938,446 | 2/1976 | Seitz et al. | 105/378 X |

FOREIGN PATENTS OR APPLICATIONS
491,563   3/1953   Canada .................. 296/55

*Primary Examiner*—Robert J. Spar
*Assistant Examiner*—Howard Beltran
*Attorney, Agent, or Firm*—Emory L. Groff, Jr.

[57] ABSTRACT

An enclosure for a vehicle end opening formed between two side walls includes two bi-fold door assemblies each comprising inner and outer panels pivotally connected to one another and with the free edge of the outer panels in turn connected to a fixed pivot point adjacent the side of the end opening wherein, each inner panel may be folded outwardly 180° about its pivoted connecting means and the thus folded assembly subsequently pivoted about its fixed pivot point 270° into parallel relationship with the vehicle side wall. The pivotal connecting means joining each pair of inner and outer panels includes catch means serving to secure the assembly in both the closed position enclosing the vehicle end opening as well as in the stored position parallel with the vehicle side wall.

20 Claims, 11 Drawing Figures

VEHICLE END ENCLOSURE

This invention relates generally, to a movable closure structure for the end opening of a vehicle and more particularly, to an improved end enclosure especially adapted for use in railway cars provided for the transportation of automobiles.

The protection or security of automobiles being transported by railway cars has long presented a serious problem. Initially, side gratings were provided on railway flat cars and this was soon found to be entirely inadequate as it merely protected against objects thrown against the side of a moving rail car, yet did not preclude damage from articles thrown over the side gratings or dropped from overpasses. At the urging of the automobile manufacturers, the railroads then provided covered cars; however, the lack of adequate enclosures at the open ends of the cars still permitted pilferage and vandalism by way of the opened car ends, especially when such loaded cars were temporarily immobile on sidings or in storage yards. The state of the art has recently advanced to include removable closure structure for the open ends of the cars and several efforts have been made in the past in this area of endeavor; however, many earlier end enclosures fall far short of providing a simple fail-safe structure which may be quickly and readily manipulated by but a single operator to displace the closure structure from the closed or sealed position to the stored open or accessible position. The problem has been compounded due to the need of maintaining structural integrity of the car structure and the usual excess width of many cars as manufactured for automobile transport.

By the present invention an improved end enclosure for a railway car is provided including a pair of bi-fold door assemblies, each of which includes an inner and an outer panel which are manipulated from the closed position to a stored position by folding the inner panel 180° into an overlying position with the outer panel and thereafter pivoting the two panels 270° about the side edge of the car end opening to place each bi-fold door assembly in a stored position parallel to and outside the side wall of the railway car. A unique lock actuating means is associated with pivot and support means interconnecting each pair of door panels forming each bi-fold door assembly and includes catch structure serving the dual function of securing each door assembly in both the closed and stored positions. The railway car side walls themselves are devoid of the usual ladder steps leading all the way to the upper part of the car, thereby preventing unauthorized access to the top of the car, while one of the door panels of each bi-fold door assembly is provided with ladder steps on its inside surface, which ladder steps are inaccessible when the end enclosure is closed, but become exposed on the outside of the car when each door assembly is in the stored position, and thereby provide ladder steps to the full height of the car and located in the same position wherein full height ladder steps are usually found on a railway car. When the door assemblies are in the stored position the overall width of the car is not increased due to the provision of appropriate recesses in the car side walls in this area of the car so that the exposed ladder steps as provided by the stored door assembly in no way extend the dimensions of an excess-width car.

Accordingly, one of the primary objects of the present invention is to provide an improved vehicle end enclosure including a pair of bi-fold door assemblies.

Another object of the present invention is to provide an improved vehicle end enclosure including a pair of door assemblies each having an outer panel and an inner panel and wherein each assembly is moved from a closed to a stored position by folding the inner panel 180° into an overlying position with the outside face of the outer panel and thereafter pivoting the door assembly 270° about its outer edge.

A further object of the present invention is to provide an improved vehicle end enclosure for a railway car having an elevated deck, including a pair of bi-fold door assemblies each provided with an outer and an inner panel interconnected by means of a pivot/lock structure including manually displaceable lock means engageable with both the elevated deck and lower portion of the car to secure the door assembly in both the closed and stored positions.

Still another object of the present invention is to provide an improved vehicle end enclosure including a pair of bi-fold door assemblies each including an outer and an inner panel interconnected by means of a pivot/lock structure including exterior pivot means connected to adjacent edges of the two panels and an interior actuator member manually operable to disengage lock means cooperating with keeper means adjacent a lower and an elevated deck of the car.

Another object of the present invention is to provide an improved vehicle end enclosure including a pivotal door panel having ladder steps on its inside face when the panel is in the closed position and which is movable to a stored position on the outside of the vehicle body, whereby the ladder steps are then exposed and accessible for use.

A further object of the present invention is to provide an improved vehicle end enclosure for a railway car having side walls provided with recesses adjacent the car end opening and a pair of bi-fold door assemblies each including a plurality of panels foldable one upon the other and in turn pivotably displaceable into said car side recesses to maintain a flush condition on the car side walls.

With these and other objects in view which will more readily appear as the nature of the invention is better understood, the present invention consists in the novel construction, combination and arrangement of parts hereinafter more fully described, illustrated and claimed.

A preferred and practical embodiment of the invention is shown in the accompanying drawings in which.

Similar reference characters designate corresponding parts throughout the several figures of the drawings.

Figure 1:
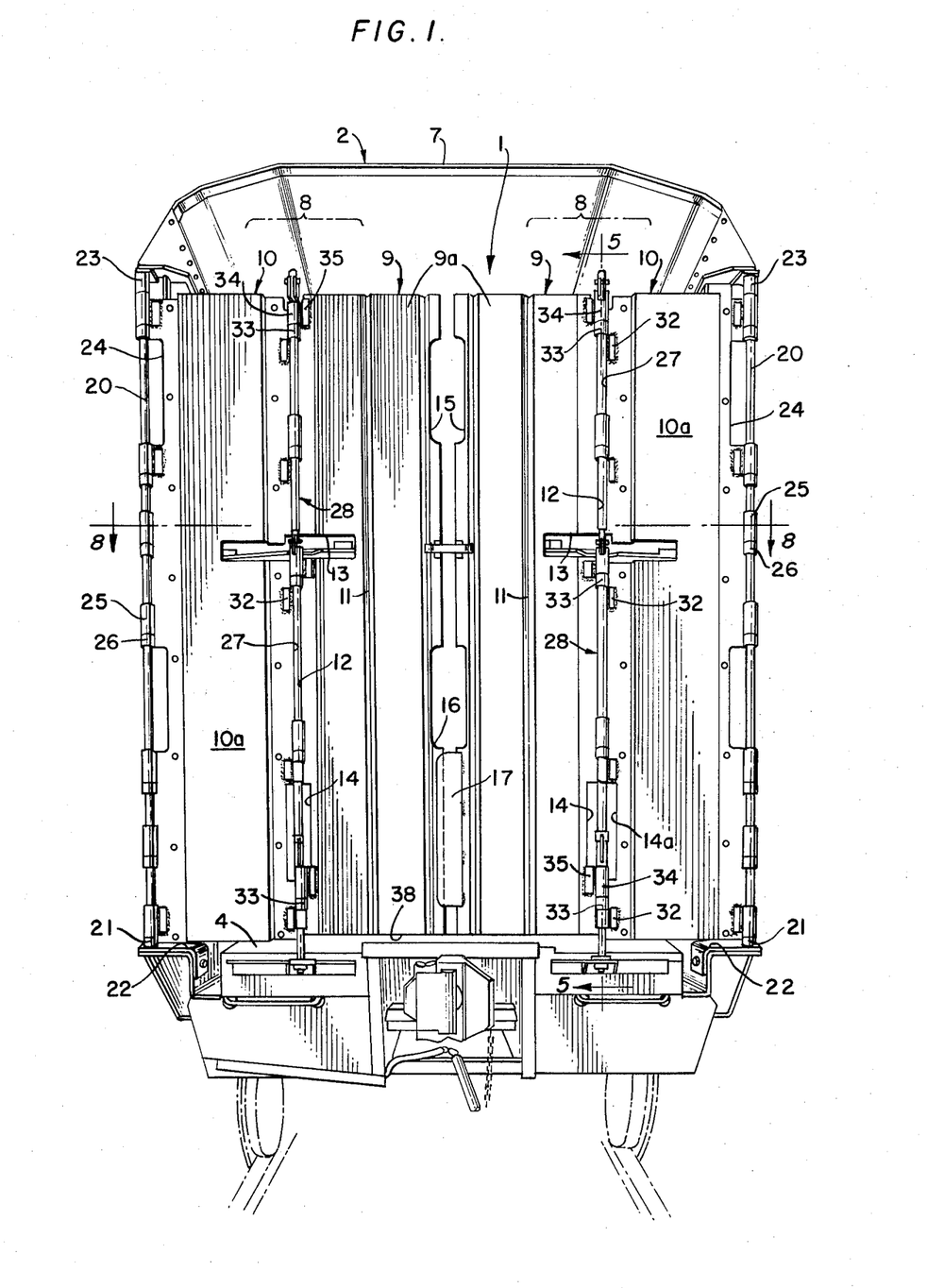
FIG. 1 is an end perspective view of a railway car provided with the end enclosure of the present invention with the bi-fold door assemblies in the closed position.

Referring now to the drawings, particularly FIG. 1, the present invention will be seen to comprise an end enclosure, generally designated 1, adapted to seal off or close substantially the entire end opening of a railway car 2. It will be readily appreciated that even though the present invention is illustrated as applied to a railway car it may be readily adapted for use with alternate types of transport vehicles such as highway trucks or trailers.

The end enclosure 1 of the present invention is particularly adaptable for closing off the end opening 3 of a railway car 2 as provided for the transport of a plurality of automobiles. Such vehicles include a main or lower deck 4 provided with any suitable well known undercarriage and are provided with the side walls 5—5. The attached drawings illustrate the end enclosure 1 as applied to a railway car 2 of the bi-level type, that is, a plurality of automobiles are transported upon the lower, main deck 4 while another row of vehicles is carried upon the elevated deck D spanning the medial height of the cargo area 6 as defined by the limits of the roof 7, side walls 5—5 and main deck 4. As will be seen hereinafter, the end enclosure 1 is just as applicable for use with a railway car of the tri-level type wherein an additional upper deck (not shown) spans the cargo area adjacent the top edge of the end enclosure, and the roof 7 is eliminated.

The vehicle end enclosure 1 comprises a pair of bi-fold door assemblies 8—8, each of which further comprises an inner panel 9 pivotally supported by and attached to an outer panel 10. It will be understood that although but one end of a car is shown as equipped with the subject end enclosure, both ends will normally be provided with the identical closure structure.

Figure 4:
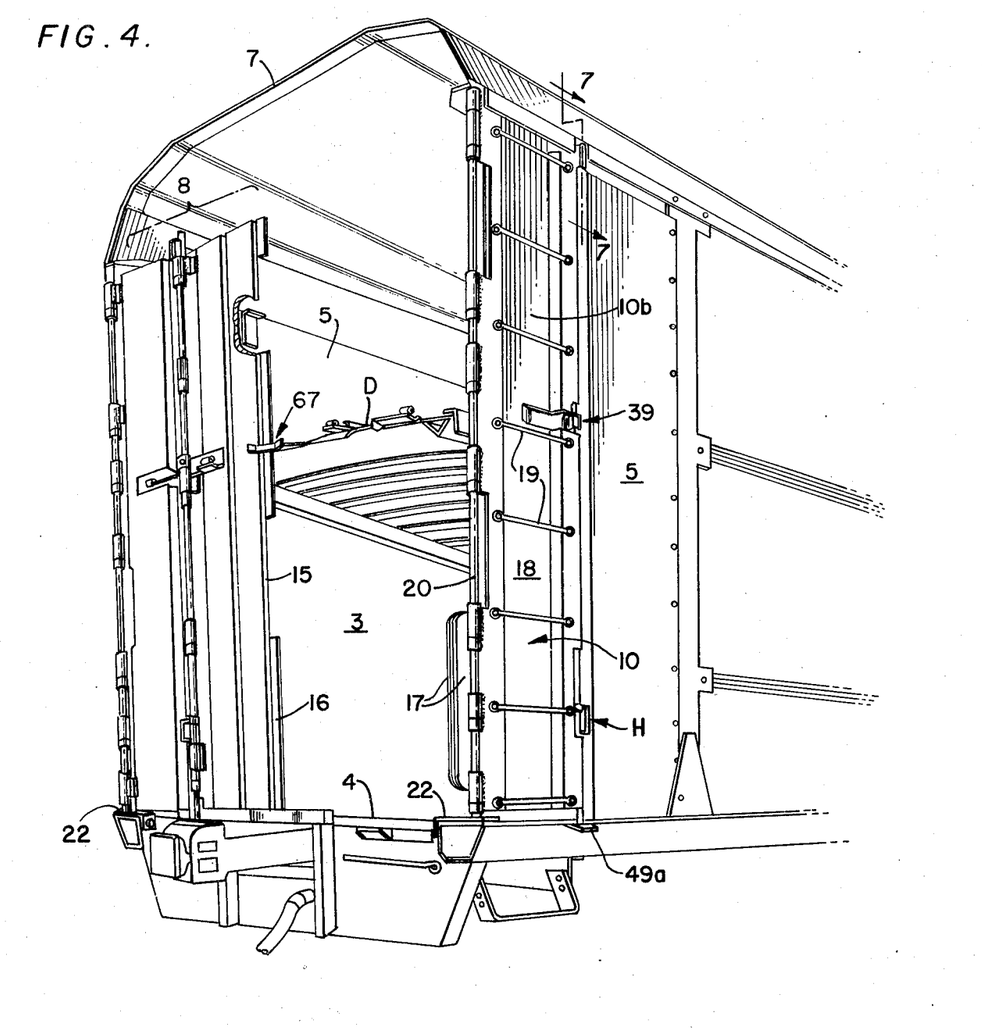
FIG. 4 is a perspective view similar to FIG. 3 and illustrates one bi-fold door assembly after it has been fully displaced to its stored position and with the previously concealed full height ladder steps now exposed and accessible for use.
Figure 8:
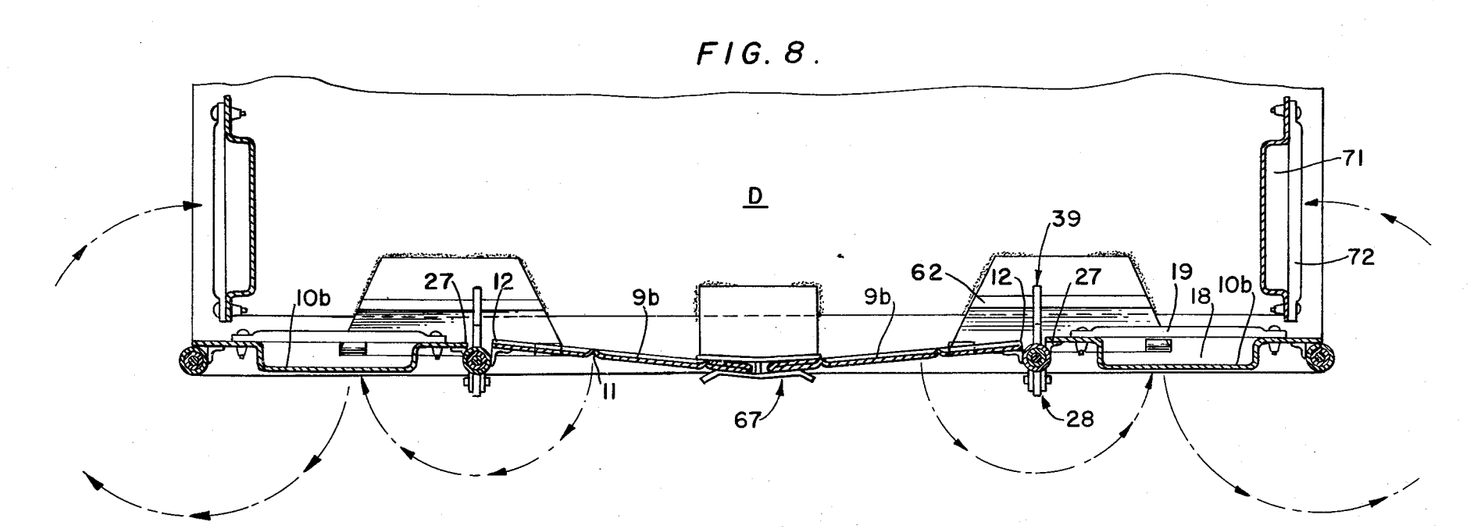
FIG. 8 is an enlarged horizontal sectional view taken along the line 8—8 of FIG. 1.
Figure 9:
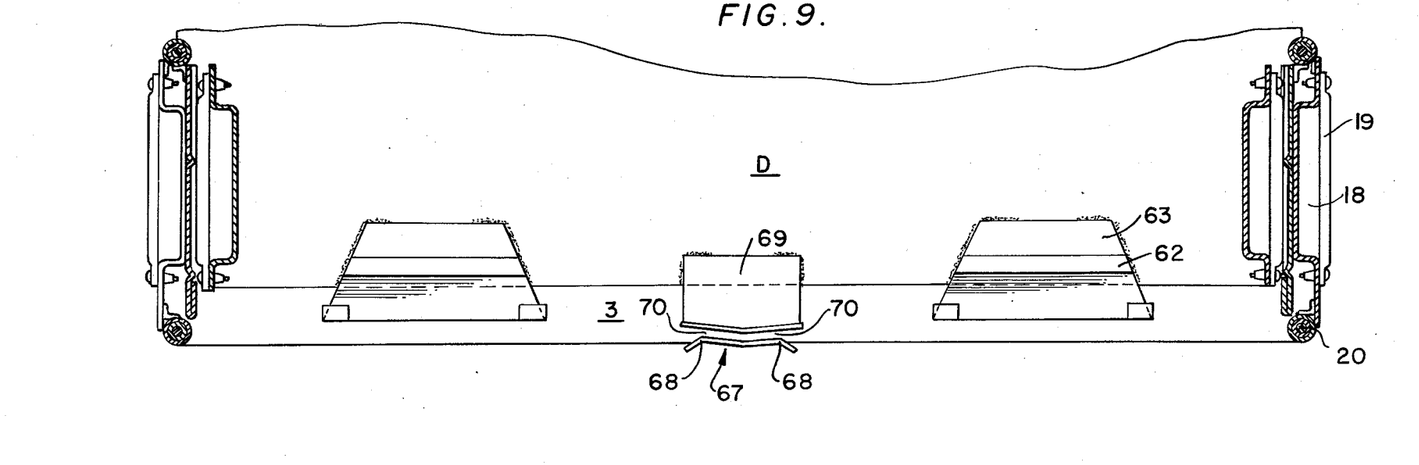
FIG. 9 is a horizontal sectional view illustrating the position of the two bi-fold door assemblies of FIG. 8 when displaced to the stored position outside the side walls of the car.

A general review of the operation of the various door panels 9 and 10 during displacement from the closed position of FIGS. 1 and 8 to the stored position as shown in the right-hand portion of FIG. 4 and in FIG. 9 will facilitate the subsequent description of the specific construction of these door panels and their locking and supporting structure.

Figure 2:
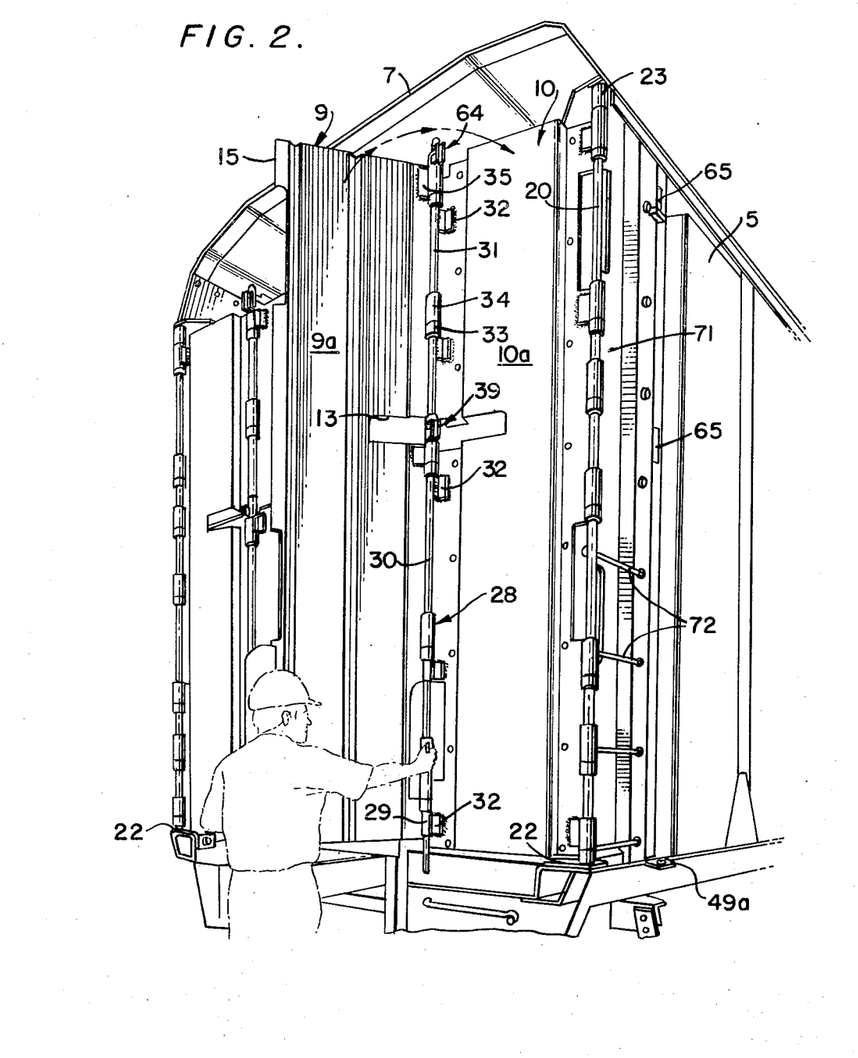
FIG. 2 is a perspective view of the structure shown in FIG. 1 and illustrates one of the door panels of one of the bi-fold door assemblies as it appears during the initial displacement from the closed to the stored position.
Figure 3:
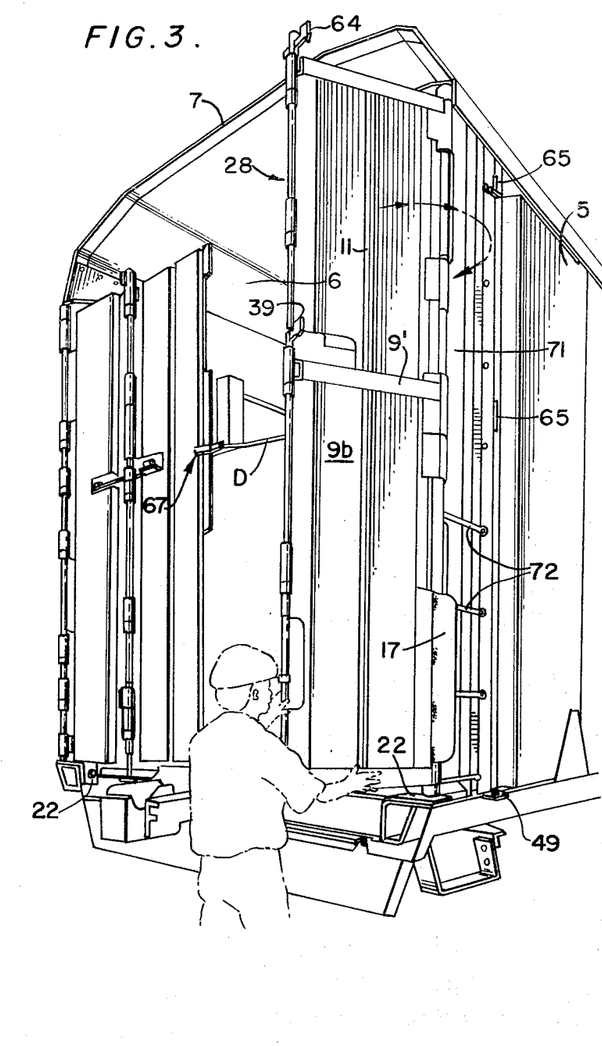
FIG. 3 is a view similar to FIG. 2 and illustrates the inner panel of one of the door assemblies after it has been folded against the outer panel and the assembly partially pivoted about its outer edge.

When the vehicle end enclosure 1 is in the fully closed position as shown in FIG. 1, the two bi-fold door assemblies 8—8 are positioned with the two inner panels 9 and two outer panels 10 disposed in a substantially co-planar vertical arrangement whereby access to the cargo area 6 is effectively precluded. In order to gain access to the cargo area 6 it is necessary to displace at least one of the bi-fold door assemblies 8 from the closed position of FIG. 1 and in order to remove automobiles contained therein, both of the door assemblies 8—8 must be displaced from the illustrated closed position to their alternate storage position. This displacement is accomplished by the actuation of unique locking and supporting hinge structure which will be described in detail hereinafter. The initial movement of each door assembly 8 comprises the manual pivoting of each inner panel 9 relative its attached outer panel 10 such that the outside face $9a$ of the inner panel 9 is folded from its co-planar relationship to the adjacent outer panel 10, 180° in order to juxtaposition the outside face $9a$ of the outer panel 9 relative the outside face $10a$ of the outer panel 10. The initiation of this displacement is shown in FIG. 2 of the drawings while the thus folded inner panel 9 will thereafter appear as shown in FIG. 3 of the drawings, it being appreciated that in this latter figure the combined inner and outer panels 9 and 10 of the righthand bi-fold door assembly 8 have been slightly pivoted as a unit about the hinge means carried by the end of the car adjacent the side edge of the end opening 3. The folded panels of the door assembly 8 are then further pivoted, as a unit, about this outside hinge pivot from the position of FIG. 3 of the drawings to the position as shown in FIG. 4 of the drawings, wherein it will be seen that the inside face $10b$ of the outer panel 10 is now exposed to the outside of the car and will be understood to be in a plane substantially co-planar with the outer surface of the side wall 5 adjacent thereto. The operation of the other, or left-hand bi-fold door assembly 8 in the above referenced figures of the drawings is exactly the same as has been described relative the right-hand door assembly 8, with the respective movements merely being directed towards the left rather than toward the right.

The description of the specific structure permitting of the above related operation may now proceed. Each of the inner door panels 9 comprises a substantially planar sheet preferably provided with a vertically disposed reinforcing rib 11 extending the full height thereof in order to impart sufficient vertical rigidity thereto. By employing stock material of adequate thickness it is usually unnecessary to provide transverse structural reinforcing for the door panels in the form of double panel sheets and accordingly the inclusion of no more than a plurality of transverse channels 9' will suffice, as shown in FIG. 3 of the drawings.

The vertical outer edge 12 of the inner panels 9 is provided with a bridge cut-out 13 at the level of the elevated deck D and a handle cut-out 14 in the area of the lock actuating means above the level of the main deck 4. The opposite or inner edge 15 of the inner panel 9 includes a tongue 16 projecting from the lower portion of one of the inner door panels 9 and a pair of spaced apart flanges 17—17 projecting from the juxtaposed inner edge 15 of the other inner door panel 9.

The outer panels 10—10 are constructed differently than the inner panels 9—9 as will be seen most clearly in FIGS. 4 and 8 of the drawings, wherein the inside face $10b$ of each of these outer panels is dished or recessed to provide a hat shape with a cavity 18 opening towards the car cargo area 6 when the door assemblies are in the closed position of FIG. 8. Spanning each cavity 18 on the inside face 10b of the outer panels 10 are a plurality of ladder steps 19 extending the entire height of the door panel and which will be seen to be spaced a significant distance from the bottom surface of the cavity 18 to provide adequate space for a secure foothold upon the steps 19.

The entire weight of each of the bi-fold door assemblies 8—8 is supported at the outer edge of its outer panel by a vertical pivot rod 20 disposed laterally outside the vertical side limits of the car end opening 3. The pivot rod 20 is retained in position by means of a lower support collar 21 attached to a mounting bracket 22 which in turn is preferably removably secured to the car frame as shown in FIG. 1 of the drawings, while the upper end of the pivot rod 20 is likewise retained by means of an upper support collar 23 secured adjacent the end of a car side wall framing such that the pivot rod 20 is thus axially fixedly attached to the car 2. Suitably attached such as by welding, to the outer edge 24 of each outer panel 10, are a plurality of vertically spaced pivot bushings 25 and through which the pivot rod 20 is disposed while immediately beneath and supporting each of the pivot bushings 25 is a door panel support collar 26, which collars will be understood to be suitably secured to the pivot rod 20 passing therethrough. From the foregoing it will be appreciated that each outer door panel 10 and all other structure attached thereto may be pivotally displaced about the vertical pivot rod 20 within the limits of the attendant car construction. In this connection, it is well to note at this point that the axis of the pivot rod 20 is disposed longitudinally beyond the end of the car side wall 5 and laterally outside the end of the car side wall, thus permitting the combined thickness of the folded panels 9 and 10 to accomplish the described 270° displacement.

Figure 5:
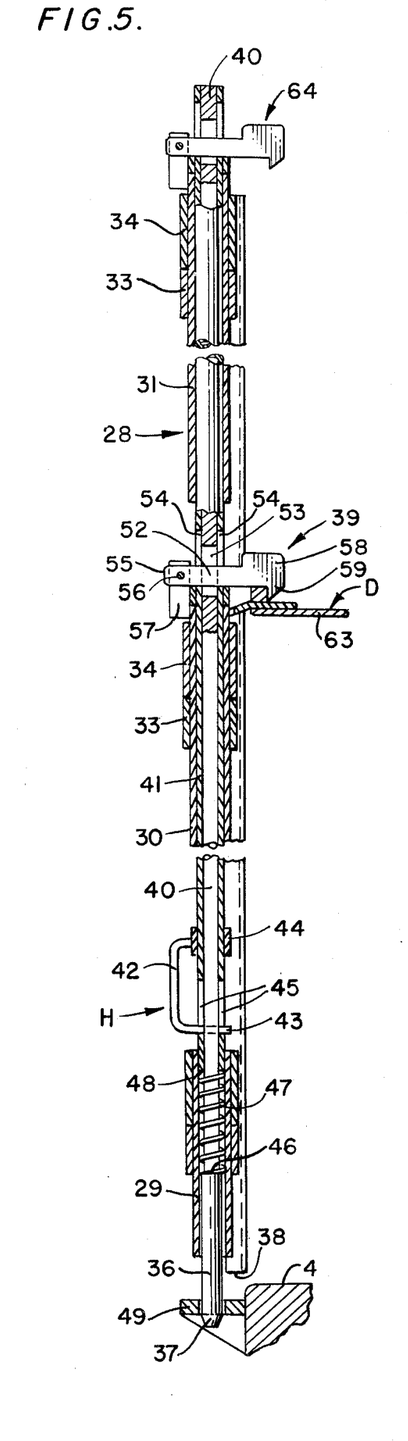
FIG. 5 is an enlarged partial vertical sectional view taken along the line 5—5 of FIG. 1 illustrates the lock-/pivot structure as it appears when the door assembly is in the closed and secured position.
Figures 6, 7, 10, 11:
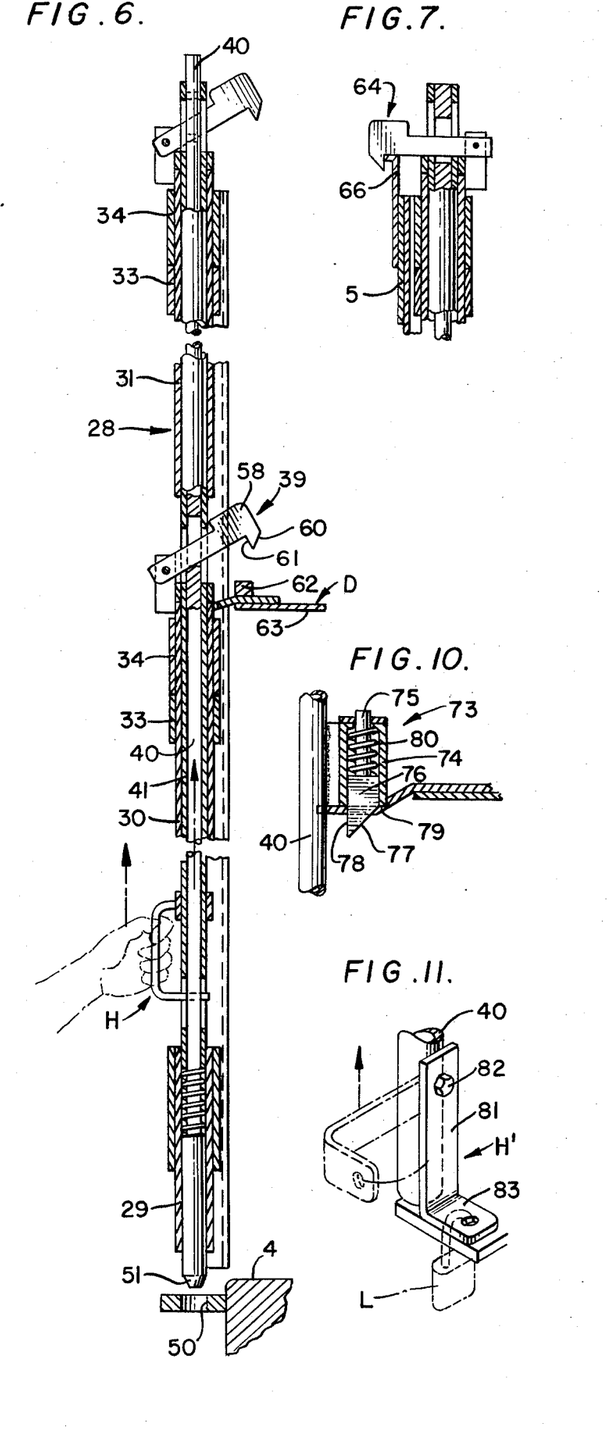
FIG. 6 is a view similar to FIG. 5 and illustrates the lock mechanism of FIG. 5 as it appears upon actuation of the catch release structure by means of a hand-actuated lift handle.
FIG. 7 is a vertical sectional view taken along the line 7—7 of FIG. 4 and illustrates the lock mechanism as it is utilized to secure a bi-fold door assembly in the stored position outside the car side wall.
FIG. 10 is a fragmentary vertical sectional view illustrating an alternative catch mechanism for each bi-fold door assembly.
FIG. 11 is a partial perspective view illustrating means for securing the end enclosure in its closed position.

The outer edge 12 of the inner panel 9 is mounted juxtaposed the inner edge 27 of the outer panel 10 by means of a lock bar/pivot tube assembly, generally designated 28, shown most clearly in FIG. 1 and in enlarged detail in FIGS. 5 and 6 of the drawings. Each door assembly 8 includes a lower 29, intermediate 30 and upper 31 bearing tube with the lower tube 29 located beneath the lock handle cut-out 14, the intermediate bearing tube 30 located between the handle cut-out 14 and bridge cut-out 13 and the upper bearing tube 31 being disposed between the bridge cut-out 13 and uppermost limit of the door assembly. Each of the three bearing tubes, which are co-axially disposed, are secured to but one of the two panels of each door assembly 8 by the welding plates 32 shown in the drawings and which are connected to the adjacent outer panels 10 in a manner to position the center axis of the bearing tubes in a plane well outside the plane of the outside faces 9a and 10a of the panels.

Surrounding each bearing tube 29, 30 and 31 at a point immediately above the respective welding plates 32 is a door panel support collar 33 which is precluded from axial displacement upon the internally disposed bearing tube either by suitably securing the collars to the bearing tube or merely by means of the engagement of the bottom of each collar upon the adjacent welding plate 32 where it joins with the bearing tube. Slideably fitted about each of the bearing tubes and resting upon each one of the support collars 33 are a plurality of inner door panel pivot bushings 34 which bushings are in turn rigidly affixed to the inner door panel 9 adjacent its outer edge 12 by means of the welding plates 35. With the foregoing structure in mind, it will be seen that the bearing tubes 29, 30 and 31 which are fixed relative the outer panels 10 will at all times support the plurality of pivot bushings 34 by means of the support collars 33 and since the pivot bushings 34, which are fixedly attached to the inner panels 9, are free to rotate about the bearing tubes, the inner panels 9 may be readily pivoted or folded about the center axis of the lock bar/pivot tube assemblies 28 with a minimum of effort.

The disposition of the bearing tubes 29–31 is critical relative the vertical plane of the two adjacent edges 12 and 27 of the inner and outer panels 9 and 10, respectively. This criticality will be readily appreciated with an understanding that the inner panels 9 and their respective edges 12 and 15 comprise a substantially co-planar sheet of material, while the outer panels 10 are substantially modified with the hat-shaped configuration such that the majority of the outside face 10a thereof is disposed in a plane well offset outwardly from the plane of the inner edge 27 thereof due to the cavity 18 formed in these panels. Thus it will be apparent that the center axis of the lock bar/pivot tube assembly 28 must be disposed in a plane located well outside the plane of the two adjacent panel edges 12 and 27 so that when the inner panels 9 are folded 180° as shown in the right-hand portion of FIG. 3 of the drawings, the juxtaposed panel outside faces 9a and 10a will be parallel to one another as viewed when the door assemblies 8 are in the stored position of FIG. 9, which figure also most clearly illustrates the substantially equal width of the inner and outer panels.

The pivoting and supporting structure associated with each lock bar/pivot tube assembly 28 now having been described, the catch or lock mechanism included therein will now be related, with particular reference being made to FIGS. 5 and 6 of the drawings. The bi-fold door assemblies 8—8 are retained in the closed position of FIGS. 1 and 8 by means of several locking and/or interlocking features. First, it will be understood that by immobilizing the lock bar/pivot tube assembly 28 with the end enclosure 1 in the closed position, any displacement of the outer panels 10—10 is precluded since the outer panel pivot rod 20 is at all times stationary and thus, in order to secure and to release the door assemblies from the closed position it becomes necessary to provide releasable means to retain the assembly 28 in its closed position, which means must allow subsequent arcuate displacement of the pivot assembly 28 to permit movement of the door assembly 8. Such means includes a lock pin or plunger 36 having a bottom end 37 normally projecting well below the lower edge 38 of the door assemblies. Additionally provided is catch means, which may comprise, as in FIGS. 5–6, a gravity lock bar, generally designated 39, normally projecting inwardly toward the cargo area 6 of the car 2 adjacent the plane of the elevated deck D. As will be seen from the description following immediately hereinafter, manual manipulation of a single door lock or catch handle H associated with each lock bar assembly 28 serves to concurrently disengage the attendant lock bar 39 and lock pin 36 from engagement with related structure so that the door assembly 8 may be outwardly displaced, folded and pivoted from the closed to the stored position.

The innermost component of each lock bar/pivot tube assembly 28 comprises a lift rod or actuating member 40 integral with the lock pin 36 and extending upwardly therefrom substantially throughout the entire vertical height of the door assembly 8. This lift rod 40 is disposed for vertical displacement within a pivot tube 41 extending from the lower bearing tube 29 upwardly through the upper bearing tube 31 and which is rotatably disposed within the respective bearing tubes. The aforementioned handle H is connected to the lift rod 40 and pivot tube 41 in the area of the handle cut-out 14 of the inner panel 9 which is juxtaposed a similar handle cut-out 14a in the inner edge of the outer panel 10. The handle will be seen to include a vertical grab bar 42 having a lower lift arm 43 disposed through the lift rod 40 and permanently affixed thereto, while the upper portion of the grab bar 42 is attached to a collar 44 slideably disposed about the exterior of the pivot tube 41. Diametrically disposed vertical slots 45—45 are cut through the pivot tube 41 to permit limited vertical displacement of the handle H and its attached lift rod 40 within the confines of the surrounding panel cut-outs 14 and 14a. Although the mass of the lift rod 40 under normal circumstances would be sufficient to retain the lift rod 40 in its lowermost position as defined by the abutment of the lift arm 43 with the bottom of the slots 45—45, nevertheless it has been found helpful to provide position spring means to ensure this normal downward displacement of the lift rod 40 and accordingly, a shoulder 46 is formed on the upper portion of the lock pin 36 at its attachment to the lift rod 40 and upon which the lower portion of a compression spring 47 engages while the upper limit of the spring 47 abuts the shoulder 48 formed by the bottom of the axially fixed pivot tube 41.

The plunger pin 36 is adapted to engage a keeper plate 49 fixedly attached to the end of the car 2 adjacent the main or lower deck 4 and includes a suitable opening 50 therein forming a mating fit for the bottom end 37 of the lock pin 36. The pin bottom end 37 may include a camfer 51 to further facilitate the guidance and entrance of the lock pin into the keeper plate opening 50.

Actuation of the door lock handle H by the vertical displacement thereof from the position of FIG. 5 to that as shown in FIG. 6, not only causes the elevation of the lock pin 36 at the lower end of the lift rod 40 against the force of the return spring 47, but also serves to concurrently disengage the catch means or lock bar 39 from its locked position of FIG. 5 to its unlocked or released position as shown in FIG. 6 of the drawings. The gravity lock bar 39 includes a longitudinal arm 52 disposed through a vertically extending slot 53 of the lift rod 40 as well as through diametrically disposed vertical slots 54—54 in the pivot tube 41. The outer end of the lock bar arm 52 terminates in a tail 55 which will be seen to be pivotally attached, as at 56, to the fixed lock bar bracket 57, which bracket is in turn secured to the outer surface of the inner door panel pivot bushing 34. The opposite end of the lock bar arm 52 terminates in an enlarged head 58 having a downwardly projecting hook 59 thereon, which hook includes a forwardly directed bevel 60 and rearwardly projecting vertical shoulder 61.

Without any outside intervention, it will be seen that when the catch means is in its normal at-rest position, the lift rod 40 will be urged to its lowermost position by gravity and/or the influence of the spring 47 until the door lock handle H lift arm 43 abuts the bottom limits of the slot 45—45 of the pivot tube 41, at which point the slot 53 in the lift rod 40 will be disposed with its lowermost portion at a level which is no higher than the bottom of the pivot tube slot 54—54. With this relationship, the lock bar 39 will have its arm 52 horizontally disposed and will remain thusly due to the combined greater mass of the major portion of the lock bar 39 being located inwardly of the center line of the lift rod 40. When in this horizontal or lowered position, the hook 59 of the lock bar 39 is adapted to engage behind a keeper bar 62 rigidly affixed to the bridge 63 of the elevated deck D, and thereby locks the medial portion of the door assembly 8 in the closed position.

Referring back to the operation of the door lock handle H from its normal at-rest position as shown in FIG. 5 of the drawings, it will now be understood that along with the vertical displacement of a lock pin 36, the lock bar 39 will be concurrently vertically pivoted about the point 56 to elevate the head 58 thereof so that the hook 59 is removed from behind the keeper bar 62. This action occurs due to the elevation of the slot 53 as the lift rod 40 is raised. It will be appreciated that a relatively small elevation of the door lock handle H and lift rod 40 is translated as a more significant elevation of the lock bar head 58 due to the fact that the center line of the lift rod 40 is substantially closer to the lock bar pivot 58 than to the lock bar hook 59 so that but a small elevation of the handle H is required in order to disengage the catch means from the deck keeper bar 62, following which the respective bi-fold door assembly 8 may be displaced from its closed to its stored positions.

The attached drawings disclose an additional catch means in the form of the second lock bar 64 located adjacent the upper edge 38' of each door assembly 8, and the associated lift rod structure in the area of this lock bar 64 is similar to that as previously described in connection with the lock bars 39. These lock bars 64 do not engage a deck keeper bar when in the closed position when used with a railway car as illustrated in the attached drawings, but may be associated with an upper deck (not shown) of a tri-level railway car adapted to transport automobiles.

An important feature of both of the lock bars 39 and 64 of each door assembly 8, whether provided for a bi-level or tri-level car, is that when the bi-fold door assemblies 8 are collapsed and pivoted to the stored position as shown in the right-hand portion of FIG. 4 and in FIG. 9, these same two lock bars 39, 64 pass through openings 65—65 in the car side wall 5 and the hooks 59 thereof engage behind a keeper plate 66 inside the side wall to retain the door assembly 8 in the stored position as shown in FIG. 7.

The above related dual function of the lock bars 39, 64 is possible due to the attachment of their brackets 57 to the door panel pivot bushings 34 which, as previously pointed out, are secured to the inner door panels 9. In view of this, it will be seen that as the inner panel 9 is initially pivoted 180° about its respective lock bar/pivot tube assembly 28, the head portion 58 of the two lock bars will likewise pivot 180° along with the inner panel until it is directed outwardly or away from the end opening 3 of the car 2 so that as the combined inner and outer panels of each door assembly 8 are subsequently pivoted 270° about the fixed pivot rod 20, the head 58 of the two lock bars 39 and 64 will be aimed towards and directed through the openings 65—65 in the side wall 5 of the car. This same interconnection between the lock bars and the inner panel 9 follows in the case of the door lock handle H in view of the attachment of the lift rod 40 to both the handle arm 43 and lock bar arms 52 so that the grab bar 42 of the handle likewise pivots 180° concurrently with the lock bars as the inner panel is folded against the outer panel. It will thus follow that following the initial elevation of the door lock handle H and the disengagement of the lock bar 39 and lock pin 36, the handle is pulled outwardly a small distance sufficient enough to clear the lock bar hook 59 from its keeper bar 62 and the bottom end 37 of the lock pin 36 from its keeper plate opening 50, whereafter the door lock handle H may be released. The structure will then appear as in FIG. 2 of the drawings following which point, the inner edge 15 of the inner panel 9 is grasped by the operator to effect the 180° folding of this panel against the outer panel 10, at which time the handle grab bar 42 passes through the cut-out 14a of the outer panel so that when the door assembly 8 is in the stored position of FIG. 4 the handle H will appear exposed to the outside of the car side as in this figure.

The bottom of the stored door assembly 8 is further secured adjacent its lower edge 38 due to the dual function of the lock pin 36 which will be seen, as in FIG. 4 of the drawings, to engage an opening in the keeper plate 49a fixedly disposed adjacent the car side wall 5.

Additional means are provided to form an interlock between the opposed inner edges 15—15 of the two bi-fold door assemblies 8—8 when in the closed position of FIG. 1 of the drawings, and comprises an intermeshing of the tongue 16 of one of the inner panels 9 within the two spaced apart flanges 17—17 of the opposite inner panel 9. This interlocking action occurs adjacent the bottom edges 38 of the two door assemblies while an additional securing of the door assembly inner edges 15—15 is accomplished in the medial area by means of the T-bar 67 secured to the edge of the elevated deck D and which includes a pair of laterally projecting arms 68—68 connected to a bracket 69 attached to the elevated deck and defining therebetween a pair of narrow laterally extending openings 70—70 into each one of which the inner edge 15 of each door panel 9 is inserted during movement of the door assemblies to the closed position, following which the lock bar/pivot tube assemblies 28 are pushed inwardly towards the end of the car 2 in order to engage the lock pins 36 and lock bars 39 thereof.

An important feature permitting of the aforedescribed displacement of each door assembly 8 into a stored position resulting in a flush car side is the provision of the vertically extending recess 71 shown most clearly in FIGS. 2 and 3 of the drawings, in the side wall 5 of the car immediately adjacent the ends thereof, A limited number of car steps 72 are provided adjacent the rear of each recess 68 and only in the lower portion thereof, and will be seen to be capable of serving solely as a hand hold for trainmen since they do not extend to the upper part of the recess 71 of the car, and therefore could not provide unwarranted access to the uppermost part of the car at the level of the top of the bi-fold assembly 8—8. It is only after a bi-fold assembly has been moved to the stored position of FIG. 4 of the drawings that access is permissible to the very top of the car side and subsequently onto the top of the elevated deck D.

Alternate catch and handle means may be substituted for the lock bars 39 and handle H described hereinbefore. As shown in FIG. 10, spring-loaded plunger catches, generally designated 73, may replace the gravity catch means 39 and 64 and comprise a housing 74 attached to the lift rod 40 and containing a vertical shaft 75 terminating in a downwardly directed lock bolt 76. The catch function is performed by the rearwardly facing bevel 77 and forward shoulder 78 on the bolt 76 in the same manner as the bevel 60 and shoulder 61 of the lock bar 39 except in this case the bottom of the bolt 76 is urged into an opening 79 provided in the deck bridge 63 by means of the spring 80. This catch 73 likewise serves the dual function of retaining the door assembly 8 in the stored position by passing through the side wall opening 65 and engaging the car side keeper plate 66.

The lock bolts 76 may be released from their secured condition in either the closed or stored position by means of the modified door lock handle H' shown in FIG. 11 which includes a vertical arm 81 pivotally attached to the lower portion of the lift rod 40 as at 82 and provided with a horizontal arm 83 normally overlying the keeper plate 49 when the door assembly is in the closed position. An appropriate lock L or seal (not shown) may be applied between the handle arm 83 and fixed keeper plate 49. To manipulate the lift tube 40 in this embodiment the handle arm 83 is pivoted upwardly and then lifted to activate the lock bolt, following which the door assembly 8 is operated in the same manner as previously described.

We claim:
1. An end enclosure for a transport vehicle having a main deck and two side walls defining an end opening therebetween including, a pair of door assemblies each having an inner door panel and an outer door panel, each said panel having an outside face and inside face and provided with an inner edge and outer edge, a lock bar/pivot tube assembly pivotally joining the respective inner edge of each said outer panel to the respective outer edge of each said inner panel of each said door assembly, fixed pivot means attaching the outer edge of each said outer panel to one side of said vehicle end opening, releasable catch means on each said lock bar/pivot tube assembly engageable with said vehicle when said door panels are disposed in a co-planar manner normal to said side walls and enclosing said end opening to define a closed position, said inner door panels each pivotable about said lock bar/pivot tube assemblies to a position with said inner door panel outside face juxtaposed and parallel to said pivotally joined outer door panel outside face forming a contiguous door assembly, and said thus contiguous door assembly thereafter pivotable about said fixed pivot means to a position parallel the outside of one said side wall with said inside face of said inner door panel juxtaposed said side wall.

2. An end enclosure according to claim 1 wherein, the center axis of said lock bar/pivot tube assembly is disposed in a vertical plane offset outwardly from said panel outside faces.

3. An end enclosure according to claim 1 wherein, said vehicle side walls include a plurality of ladder steps on the outside surface thereof adjacent said fixed pivot means and disposed solely below the medial height of said side walls, and said outer panel inside faces provided with a plurality of ladder steps thereon disposed throughout the height thereof whereby, when said door assemblies are folded to be contiguous and swung from said closed to said stored position said full height steps on said outer panels are shifted from a hidden position within said vehicle to an accessible position outside the vehicle overlying said side wall steps.

4. An end enclosure according to claim 3 wherein, said outer door panels include a hat-shaped configuration on said inside face defining a cavity extending the height of said outer panels and said outer panel steps span said cavity.

5. An end enclosure according to claim 1 wherein, each said vehicle side wall includes a recess adjacent said fixed pivot means extending vertically no less than the height of said door assemblies, and said folded contiguous door assemblies when swung about said fixed pivot means are disposed within said recesses.

6. An end enclosure according to claim 5 wherein, said inner and outer door panels are of substantially equal width and said folded contiguous door assemblies provide a close mating fit within said side wall recesses.

7. An end enclosure according to claim 5 wherein, said fixed pivot means comprises a pivot rod having its axis disposed substantially outside the plane of the bottom of said side wall recess.

8. An end enclosure according to claim 5 including, a plurality of ladder steps within said side wall recesses, terminating substantially below the top of said recesses.

9. An end enclosure according to claim 1 including, interlocking means on each said inner edge of said inner door panels mating when said door assemblies are in said closed position.

10. An end enclosure according to claim 9 wherein, said interlocking means includes a tongue on one said inner panel and a pair of flanges on the other said inner panel providing a groove therebetween mating with said tongue.

11. An end enclosure according to claim 9 including, an elevated deck within said vehicle, a T-bar projecting outwardly from said elevated deck and said inner edges of said inner panels engage behind said T-bar when said door assemblies are in said closed position.

12. An end enclosure according to claim 1 wherein, said vehicle includes an elevated deck, and said catch means includes a shiftable lock member carried by said lock bar/pivot tube assembly and engageable with said elevated deck to secure each said door assembly in said closed position.

13. An end enclosure according to claim 12 wherein, said lock member includes a gravity lock bar.

14. An end enclosure according to claim 12 wherein, said lock member includes a spring-urged lock bolt.

15. An end enclosure according to claim 12 wherein, said catch means includes a lock pin projecting downwardly from said door assembly and engageable with keeper means adjacent said main deck concurrently with said lock member engagement.

16. An end enclosure according to claim 12 including, keeper means adjacent said side walls in the same horizontal plane as said elevated deck and engageable by said lock members when said contiguous door assemblies are moved to said stored positions.

17. An end enclosure according to claim 1 wherein, each said lock bar/pivot tube assembly includes a bearing tube attached to one said panel, a pivot bushing carried by said bearing tube and attached to the other one side panel of each said door assembly, actuating means within said bearing tube engaging said catch means and a handle attached to said actuating means to vertically displace said catch means from engagement with said vehicle.

18. An end enclosure according to claim 17 wherein, said catch means includes a spring-urged lock bolt carried by said actuating means.

19. An end enclosure according to claim 17 wherein, said catch means includes a vertically movable lock member arcuately displaceable with said pivot bushing when said inner door panel is folded, keeper means adjacent said side wall disposed in the same horizontal plane as said lock member whereby, when said inner panel is folded against said outer panel said lock member is concurrently rotated and subsequently engages said side wall keeper means when said contiguous door assembly is moved to said stored position.

20. An end enclosure according to claim 19 wherein, said lock member includes a gravity lock bar and said handle rotates concurrently with said lock bar.

* * * * *